Sept. 6, 1966 A. PHILLIPSON ETAL 3,271,483
METHOD AND APPARATUS FOR DISCHARGING STATIC DURING MANUFACTURE OF RECORD DISKS
Filed March 15, 1965
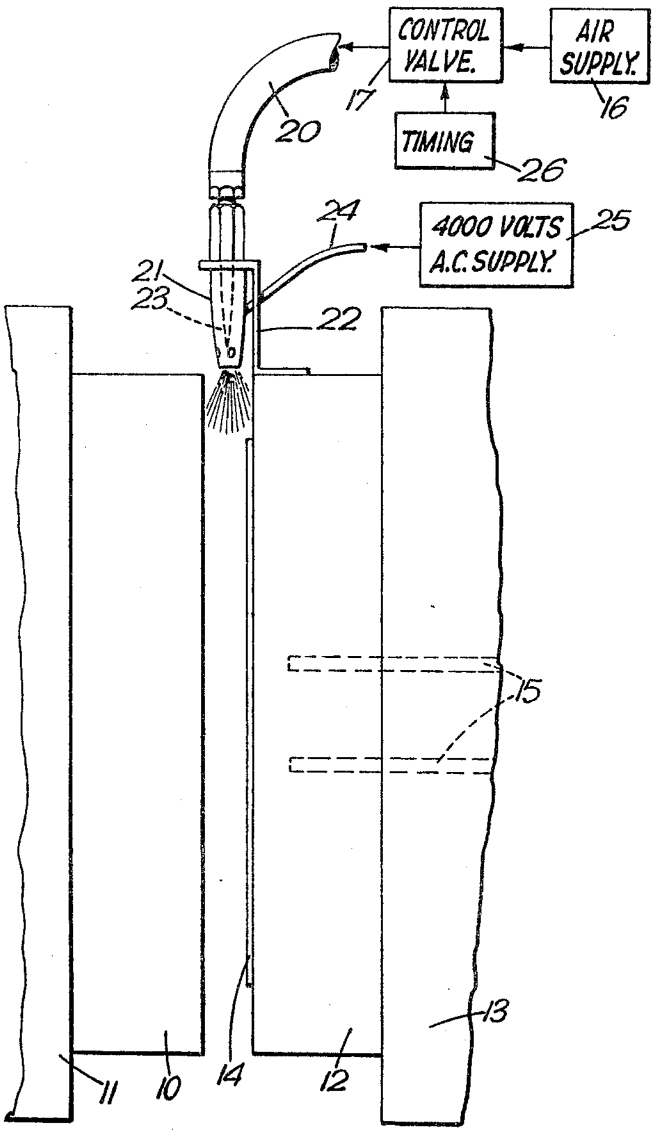

United States Patent Office 3,271,483

Patented Sept. 6, 1966

3,271,483

METHOD AND APPARATUS FOR DISCHARGING STATIC DURING MANUFACTURE OF RECORD DISKS

Alan Phillipson, Basil Harry Royston Spiller, Robin Smith, and Harry Cheesman, all of London, England, assignors to Decca Limited, London, England, a British company Filed Mar. 15, 1965, Ser. No. 439,646
Claims priority, application Great Britain, May 12, 1964, 19,707/64
8 Claims. (Cl. 264—22)

This invention relates to the manufacturing of phonograph records by injection moulding. The injection moulding process may produce a complete phonograph record with the sound track or may be used to produce a blank disc of the required form on which a sound track may subsequently be embossed. A complete phonograph record produced in this way must have the surface or surfaces containing the sound track corresponding exactly to the die. A blank disc for subsequent embossing must have extremely smooth surfaces. In the following description the term "phonograph record" will be used to mean either a completely formed record or a blank preformed record disc for subsequent embossing.

Such a phonograph record can be made by injection moulding using a polyvinylchloride polyvinylacetate material, such as for example, the material described and claimed in the specification of co-pending application No. 370,939. Such material, however, is a good electrical insulator and, because of the extremely smooth surfaces, tends to collect electrostatic charges. If such a disc is ejected from a two-part mould of an injection moulding apparatus after the mould is opened using ejector pins in the conventional way, it is liable to jump back into the mould when the ejector pins are withdrawn because of the electrostatic attraction.

According to this invention, a method of making a phonograph record by injection moulding includes the step, when the mould is opened and the record disc has been forced away from the faces of the mould, of directing a jet of ionized air at the disc so as to discharge any static charges on the disc. This prevents the disc from being attracted electrostatically to one or other part of the mould and hence it can fall away freely when ejected from the mould.

The disc may be ejected from the mould by using ejector pins which pass through apertures in the moving die plate and the invention includes within its scope a method of making a phonograph record comprising the steps of closing together the dies of an injection moulding machine, forcing moulding material into the closed die cavity to form a record disc, moving the dies apart with the disc adhering to the moving die, ejecting the disc from the moving die by ejector pins and, when the mould is opened, directing a jet of ionized air at the two faces of the disc so as to discharge any static charges on the disc.

Preferably the ejector pins are retractable as described and claimed in the specification of British patent applications No. 3,665/65 so that they may be withdrawn as soon as the record disc has been released from the moving die plate and the invention further includes within its scope a method of making a phonograph record by injection moulding including the step, when the mould is opened, of directing a jet of ionized air at the two faces of the disc before the ejector pins are withdrawn so as to discharge any static charges on the disc.

Preferably the air is ionized by electrodes an alternating voltage is applied to ensure that charges of either polarity are removed. Typically the air, before being directed over the sides of the disc, is ionized by passing it between electrodes at a high potential, for example, 4000 volts, which electrodes may conveniently be energized from a low frequency alternating current mains supply, e.g. a 50 or 60 cycle per second supply.

The invention also includes within its scope injection moulding apparatus for moulding a blank disc for a phonograph record wherein means are provided for automatically directing a jet of ionized air at the faces of the disc after the mould has been opened. If the ejector pins are retractable as described above, said means for directing a jet of ionized air at the faces are arranged to direct this jet at the disc before the ejector pins are withdrawn. The air jet need only be applied for a short time whilst ejection takes place and may be controlled in synchronism with the ejector means.

The invention furthermore includes within its scope a phonograph record formed by the above method.

The following is a description of one embodiment of the invention, reference being made to the accompanying drawing which is a diagrammatic representation of part of an injection moulding machine for moulding phonograph records.

Referring to the drawing, there is shown a fixed die plate 10 carried on a fixed platen 11 and a moving die plate 12 carried on a moving platen 13. When the die plates 11, 12 are tight together, they form a cavity into which a suitable moulding material, such as that described and claimed in the specification of co-pending application No. 370,939 is injected to form a phonograph record. If the record is to be a complete record carrying the sound tracks, the die plate each carry a suitable matrix to form the record groove. If the record is to be a blank record for subsequent embossing, then the die plates must have the necessary very smooth surfaces to form a blank disc of the correct size and shape. The disc, for example, would be formed with the centre part thicker than the outer periphery as is the standard practice with phonograph records.

The moulding material is injected into the die cavity in the known manner and the die is then opened by moving back the platen 13 and die plate 12, the disc, which is illustrated diagrammatically at 14, is carried with the moving die plate 12 as is the usual practice in injection moulding machines. In the moulding of phonograph records and particularly in the case of blank discs for subsequent embossing, it is desirable that the disc should be flat and it is preferred to make the disc adhere to the moving die plate not by maintaining a small temperature difference between the plates, as is the usual practice in injection moulding, but by admitting air between the fixed die and the disc as is described and claimed in the specification of co-pending British application No. 3,530/65.

As the die plate 12 moves back, the disc comes into contact with stationary ejector pins 15, four such pins typically being provided, arranged evenly around the centre of the discs. These pins 15 force the disc off the moving die plate 12 so that the disc falls away onto a guide (not shown) which feeds the disc to a store or packaging apparatus.

The present invention is concerned more particularly with the electrostatic charges on the disc which tend to attract the disc to one of the die plates. It is essential that the disc should fall away before the next cycle of operation and, to ensure this, a jet of ionized air is directed onto the disc at the appropriate time whilst ejection is taking place. Dry clean air from an air supply source 16, such as a compressor, is fed through a control valve 17 to a flexible tube 20 of electrically insulating material. This tube 20 leads to a nozzle 21 secured to a bracket 22 on the moving die plate 12. In the nozzle is a metal spike 23 pointing in the direction of the air stream. The outer part of the nozzle 21 is formed of metal and is electrically earthed. The spike 23 is connected by a lead 24 to a 4000 volt alternating current supply source 25, typically a transformer fed from a 50 c./s. or 60 c./s. alternating supply mains, so that the spike is at a high potential alternating above and below earth at the supply frequency. The sharp point of the spike 23 causes the electrical charges on the spike to be carried away by the air stream which is thus ionized. The jet of ionized air from the nozzle 21 directed onto the disc 14 so that, when the disc is forced off the die plate 12 by the ejector pins 15, the ionized air stream passes over both faces of the disc. Since the jet is ionized alternately positively and negatively with respect to earth, electrical charges on the disc of either polarity are moved by the ionized air stream. This ensures that the disc falls away freely and is not attracted electrostatically onto one of the die plates.

The air jet is required only when ejection is taking place. The air control valve 17 is therefore controlled by a timing device 26 to operate in synchronism with the cycle of operation of the moulding machine. In an automatic injection moulding machine in which a succession of records are produced in regular sequence, the timing device 26 may be part of the timing system for controlling the cycle of operation of the machine. Alternatively the timing device 26 may be controlled from the machine, e.g. a microswitch operated by the moving platen 13.

We claim:

1. A method of making a phonograph record by injection moulding including the steps, when the mould is opened and the record disc has been forced away from the faces of the mould, of directing a jet of ionized air at the disc so as to discharge any static charges on the disc.

2. A method of making a phonograph record by injection moulding including the step, when the mould is opened, of directing a jet of ionized air at the two faces of the disc before the ejector pins are withdrawn so as to discharge any static charges on the disc.

3. A method of making a phonograph record comprising the steps of closing together the dies of an injection moulding machine, forcing moulding material into the closed die cavity to form a record disc, moving the dies apart with the disc adhering to the moving die, ejecting the disc from the moving die by ejector pins and, when the mould is opened, directing a jet of ionized air at the two faces of the disc so as to discharge any static charges on the disc.

4. A method as claimed in claim 3 wherein the ionized air is ionized by passing it between electrodes to which an alternating voltage is applied.

5. Injection moulding apparatus for moulding a phonograph record comprising a fixed die, a moving die, means for closing the dies together to form a mould, and means for automatically directing a jet of ionized air at the faces of the record disc after the mould has been opened.

6. Injection moulding apparatus as claimed in claim 5, and having retractable ejector pins, wherein said means for directing a jet of ionized air at the faces of the disc are arranged automatically to direct this jet at the disc before the ejector pins are withdrawn.

7. Injection moulding apparatus as claimed in claim 5 wherein, to give said jet of ionized air, there are provided electrodes energised to be at an alternating voltage and means for passing a stream of air between the electrodes.

8. Injection moulding apparatus as claimed in claim 5 wherein means are provided for controlling the air jet in synchronism with the moulding cycle so that the air jet is applied only when ejection takes place.

References Cited by the Examiner

UNITED STATES PATENTS

| | | | |
|---|---|---|---|
| 2,642,621 | 6/1953 | Amo | 18—5.3 X |
| 2,993,234 | 7/1961 | Miura et al. | 264—107 |
| 3,068,511 | 12/1962 | Ahlbeck | 264—22 X |

ROBERT F. WHITE, *Primary Examiner.*

R. B. MOFFITT, *Assistant Examiner.*